Nov. 27, 1934.  H. HOWARD  1,982,518
SCALE PREVENTION
Filed Feb. 24, 1933   2 Sheets-Sheet 1
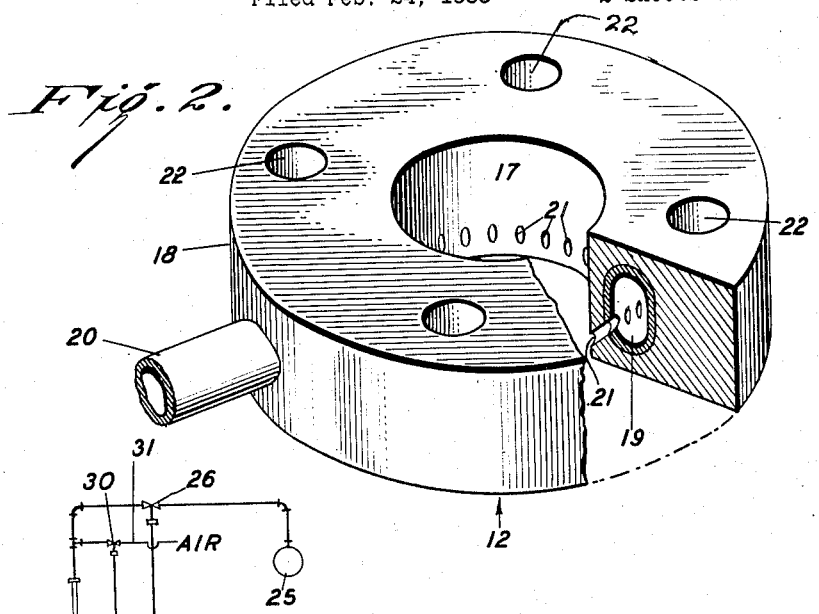
Fig. 2.
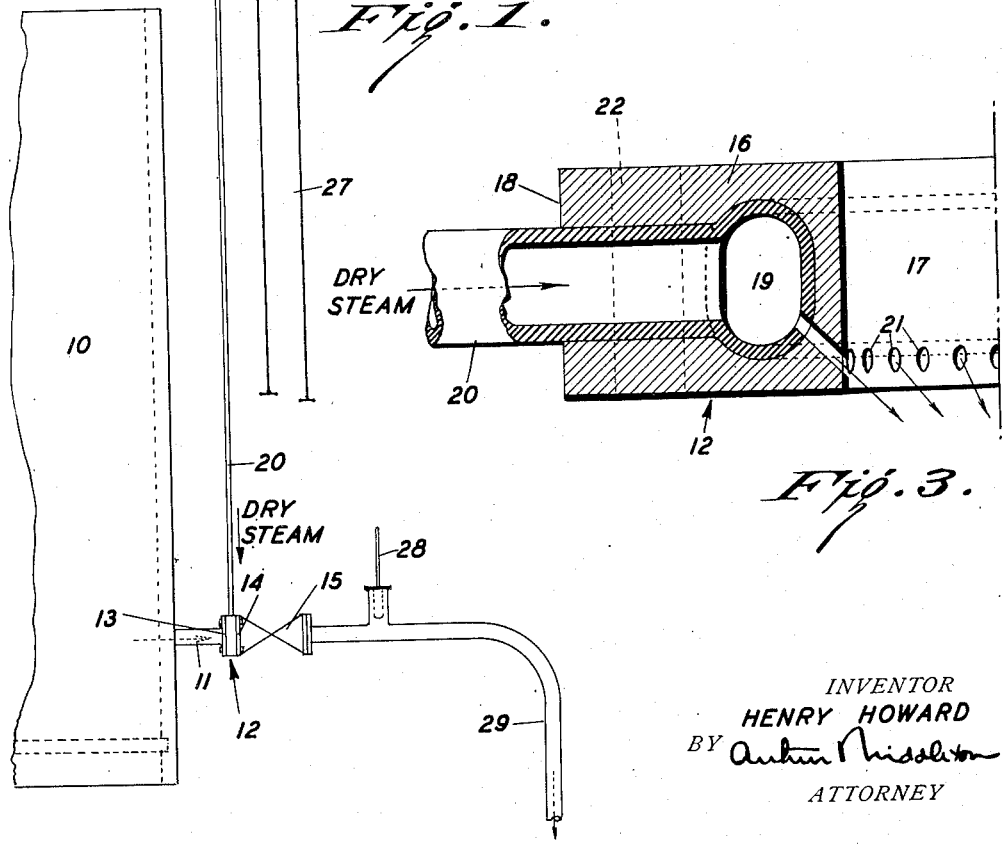
Fig. 1.
Fig. 3.
INVENTOR
HENRY HOWARD
BY
ATTORNEY

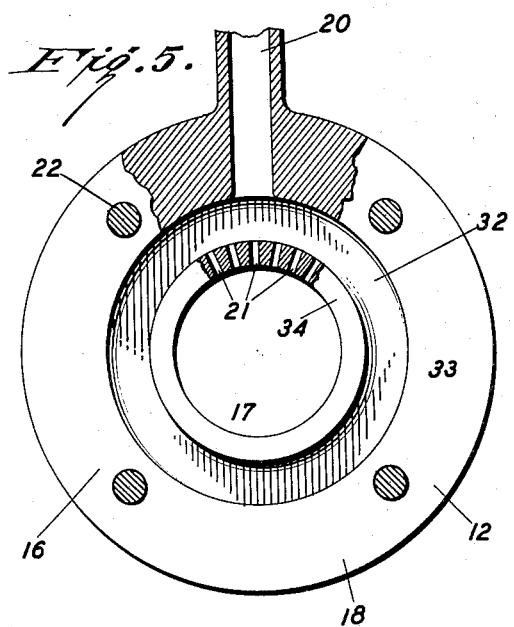
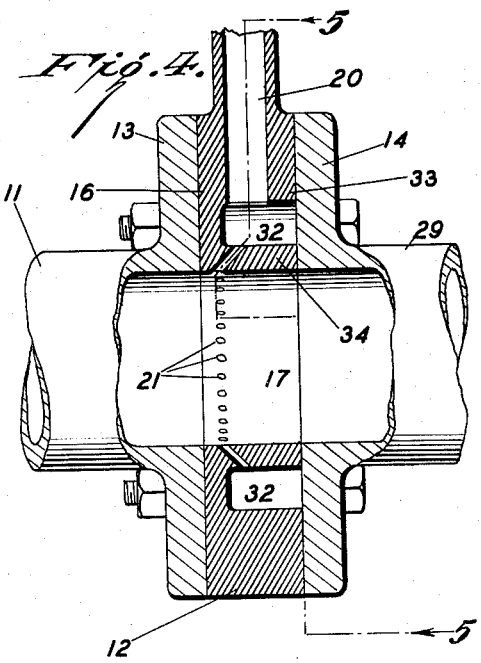
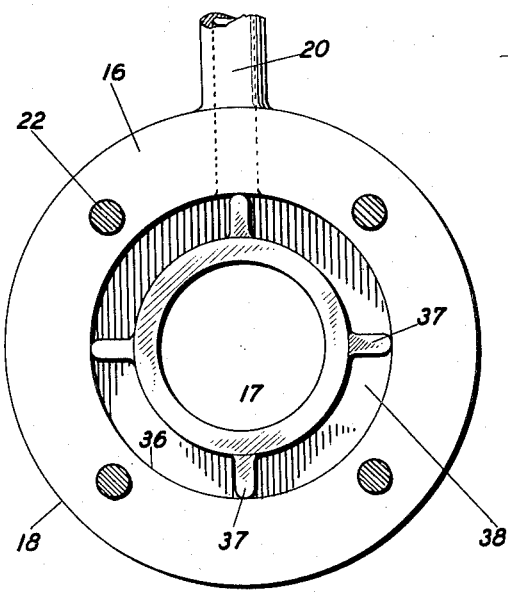
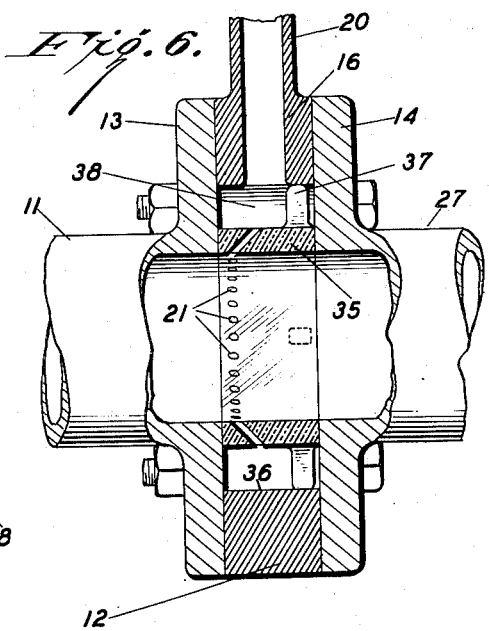

UNITED STATES PATENT OFFICE 1,982,518

SCALE PREVENTION

Henry Howard, Newport, R. I.

Application February 24, 1933, Serial No. 658,422

3 Claims. (Cl. 29—81)

This invention relates to a method of and apparatus for preventing the formation of scale in pipes.

By way of illustration of its manner of use, reference may be made to the fact fairly well known in the manufacture of phosphoric acid, that scale or encrustations form in pipes handling the filtrate after the solution has passed through strong acid or semi-hydrate filters. Analysis of this scale has proven that it consists largely of sodium silico fluoride with, usually, a considerable amount of gypsum.

The reason for the formation of the encrustation is that these materials are less soluble in cool phosphoric acid than they are when the acid is at a higher temperature. The crustation seems to form when the phosphoric acid is gradually cooled and its formation has a tendency to choke up the pipes.

Substantially all the sodium silico fluoride which will crystallize out at a temperature of, say, 63° C. will have separated out on the large quantity of mud in suspension. Upon removal of this mud, additional cooling of the filtrate usually causes super-saturation and it is these super-saturated liquors passing through the lead pipes that produce encrustations and cause so much trouble with the normal flow.

While my invention has for one of its objects the solution of this particular problem it also has more general application. It may be used in connection with any solution having soluble solids in solution which crystallize or otherwise separate out as the temperature of the solution drops. So my invention comprises a method of heating such a solution within a pipe line to a temperature at or above that at which its soluble components remain in solution. The present invention also contemplates the provision of extremely simple and highly effective heating means which may readily be applied or installed in any pipe line whereby the temperature of the filtrate carried by the pipe line may be satisfactorily maintained at or above the temperature at which it was filtered, thus bringing about the double result of preventing the formation in the pipes of scale or encrustation and of increasing the solvent action of the solution to re-dissolve any deposit which had previously been formed on the pipes.

A further object of the invention is to provide a simple and easily applied device which will permit the injection of steam or other heating fluid directly into the pipe in such a quantity and manner as will assure the overcoming of the pipe encrustation problem.

The invention possesses other objects and features of advantage, some of which, with the foregoing, will be set forth in the following description of my invention.

In the accompanying drawings, I have illustrated the best embodiment of my invention known to me, but such embodiment is to be regarded as typical only of many possible embodiments and my invention is not to be limited thereto. In the drawings, Figure 1 is a diagrammatic showing of a filtrate storage tank illustrating the multiple jet in position; Figure 2 is a view in perspective partially broken away and shown in section in the invention; Figure 3 is a detail sectional view through a portion thereof. Figures 4 and 6 are partial sectional views of modified forms and Figures 5 and 7 respectively are plan views thereof.

Figure 1 of the accompanying drawings, illustrates a preferred illustration of the invention wherein a filtrate storage tank, is indicated at 10, is provided with an outlet pipe 11, which is located a relatively short distance from the bottom of the tank.

The heating multiple jet device forming an embodiment of the present invention is shown generally at 12. It may be located wherever desired but I prefer to place it between a pair of normally abutting pipe flanges such as the flange 13 of the outlet pipe 11 from the tank 10 and the adjacent flange 14 of the shut-off valve 15, to which it is secured by means of bolts or the like.

It will be noted with particular reference to Figures 2 and 3 which illustrate the heating jet device in detail, that the body portion 16 is substantially in the form of an annulus and cast or made of high chromium alloys or such other metal that is not corroded or injured by the solution being carried by the pipe line. A cast body of antimonial lead has given satisfactory results in a phosphoric acid plant. This annular body portion 16 may be provided with relatively smooth machined faces adapted to be closely fitted with respect to the pipe flanges 13 and 14, and is further provided with a central bore or opening 17, of the substantial diameter of the adjacent outlet pipe 11. The outer diameter 18 of the body portion 16 may be similar to the outer diameters of the flanges 13 and 14, while its thickness is not in excess of the bore therein, or of the inner diameter of the pipe line in which it is inserted.

A continuously formed tubular tube or pipe indicated at 19 is cast or otherwise imbedded or located within the body portion 16. This pipe which may also be cast is slightly flattened in cross section, as shown in the drawings; the flat side portions of the tube being substantially parallel with the bore 17. An inlet for steam to the tubular pipe 19 is provided by means of a steam supply pipe 20 which may also be formed of lead and which preferably is connected to the pipe by welding.

A plurality of radially extending but diagonally or laterally disposed ducts or openings 21, preferably focused to a point, are formed through the body portion 16 and the tubular pipe 19 for the purpose of directing the injected steam toward the center of the bore 17 and in the direction of the flow of the liquid. These comprise holes or ducts preferably drilled into the tubular pipe 19 from the central bore 17 so that they will communicate therewith, the size and number depending upon the diameter of the bore, the temperature desired, and the rate of flow. The combined area of the openings 21 is less than the area enclosed by the tube 19 so as to insure a reasonably uniform pressure on all of the small jets of steam, thereby getting a high velocity on the steam as it enters the stream of liquid to be heated. It is an important part of the design that these jets should be so proportioned as to diameter and number that it will necessitate a rapid flow of steam through them, otherwise there will be more of a tendency to hammer and rattle when the steam is turned off. The bolt holes 22, which are formed through the body portion 16 are located beyond the outer diameter of the tubular pipe 19.

When it is desired to install the heating jet body portion 16 into a system having pipes, I have found it practicable merely to separate the flange of the outlet pipe from its valve and insert the body portion 16, there being sufficient flexibility in the lead pipes to permit of its installation therein. If it is desired to insert the heating jet device between two abutting pipe flanges, the flanges are merely sprung or pried apart enough to permit the insertion of the device therebetween. Thereafter it is bolted in place and connected to a source of steam. These heating devices may be used at intervals in a pipe line to keep the liquid material flowing through the pipe uniformly at the desired temperature.

Referring again to Figure 1, it will be understood that the steam pipe 20 leads to the steam header 25 from whence dry steam can be had (to prevent unnecessary dilution of the solution) and that the valves 26 may be conveniently operated by the extension rods 27 so that the operator may readily observe the indications of a thermometer located within its respective well in the outlet pipe 29. The valve 30 in an air line 31 is to admit air to the pipe 20 when valve 26 is shut off to prevent acid from being sucked up into and destroying the valve 26 by the vacuum produced from condensation of the steam after valve 26 has been closed.

Instead of having the tube 19 embedded in the body portion 16 as shown in Fig. 2, an annular groove 32 may be provided in the body portion 16 as shown in Figs. 4 and 5, extending inwardly from one face 33 of the heating device and closed by pipe flange 14 against which it is bolted. This is the equivalent of the tube 19 but may be cheaper to make in this form. The annular groove 32 has the effect of leaving a flange 34 on the body 16 through which the steam jets 21 pass at an angle, as they do in the Figures 2 and 3 embodiment. A gasket may be used if desired to make a steam-tight joint between the heater 12 and the pipe flange 14.

Again, instead of having the tube 19 embedded in the body 16 as in Figure 2, the jets 21 are drilled through a ring or collar 35 which is removable and held in place in the bore 36 of the body 16 by means of fingers or lugs 37. The collar 35 is held in place laterally by the pipe flanges 13 and 14. This construction leaves an annular space 38 between the body 16 and the ring collar 35 which is equivalent to the tube 19 in Figure 2. This arrangement has the advantage of permitting the use of a relatively expensive alloy for the collar 35 which is exposed to the greatest wear while the body portion 16 may be made of relatively cheap material. The collar 35 may be made of earthenware or Pyrex glass, if it were necessary to have it resist corrosive action of the solution being heated. Gaskets may be used between the heater 12 and the pipe flanges 13 and 14 if necessary to make a steam-tight joint.

A wide range of temperatures may be obtained with the use of my invention in installations of this nature and I have also found that my device lessens the usual noise and jarring or hammering noises frequently resulting from heating liquid in pipes with live steam.

I claim:—

1. In a pipe line, a heating jet device for use in connection with any solution having soluble solids in solution therein which separate out as the temperature of the solution falls comprising an annular main body portion having flat faces and adapted for ready insertion between and attachment to abutting flanges in a pipe line in which the device is to be inserted, with the bore of the annular body being of a diameter not less than the inside diameter of the pipes with which the body is to be associated and with the thickness of the body being not in excess of the inside diameter of the pipes to which it is attachable whereby said jet device may be introduced into an existing pipe line without remodelling the pipe line, because the narrowness of the jet device is such that the pipe-line has enough flexibility to be sprung apart to make room for the insertion of the device therein.

2. A pipe line equipped with a plurality of heating jet devices according to claim 1, in which said devices are introduced between abutting flanges in the pipe line at sufficiently frequent intervals to maintain a substantially uniform temperature throughout the solution passing through the pipe line.

3. In a pipe line a heating jet device according to claim 1, in which the device is made of acid resisting material.

HENRY HOWARD.